Figure 1A:
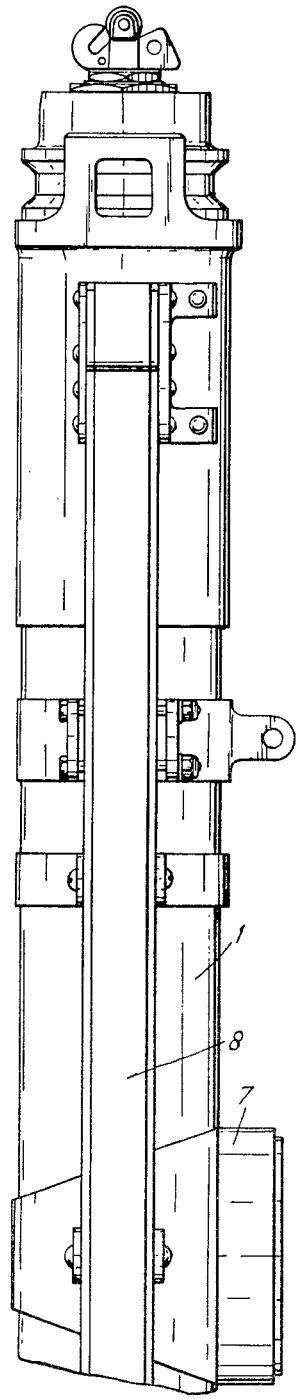

March 16, 1965  J. MARTIN  3,173,333
VEHICLE EJECTION SEATS

Filed Feb. 15, 1963  2 Sheets-Sheet 1

Inventor
JAMES MARTIN
By
Kurt Kelman
agent.

March 16, 1965 J. MARTIN 3,173,333
VEHICLE EJECTION SEATS
Filed Feb. 15, 1963 2 Sheets-Sheet 2

Inventor
JAMES MARTIN
By

United States Patent Office 3,173,333
Patented Mar. 16, 1965

3,173,333
VEHICLE EJECTION SEATS
James Martin, Southlands Manor, Southlands Road,
Denham, near Uxbridge, Middlesex, England
Filed Feb. 15, 1963, Ser. No. 258,831
Claims priority, application Great Britain, Feb. 16, 1962,
5,990/62
3 Claims. (Cl. 89—1)

This invention concerns escape system for aircraft and other analogous vehicles designated as "aircraft" throughout the specification and claims.

With the advance that has taken place in the development of aircraft escape systems including ejector seats, the likelihood of an airman having to enter the water while in his aircraft, for example in the event of an emergency whilst flying over the sea, has been reduced to almost negligible proportions. However, in the case of aircraft operating from navel aircraft carriers, there is an ever present danger of an airman and his aircraft entering the water as a result of the aircraft failing to be arrested by the arrestor devices on the carrier and falling over the side of the carrier, or as the result of engine failure or like mishap during take-off.

Research and experimentation in ejecting airmen from their aircraft has shown that undesirable and even harmful effects are suffered by the airman when the normal type of ejection gun, for example of the construction described and illustrated in Patent No. 2,736,236, is used to eject an airman and his seat from a submerged aircraft.

Thus, one particular object of this invention is to provide a seat ejection gun having the required characteristics for satisfactory and safe ejection from a submerged aircraft, in addition to the characteristics required for normal, air-environment ejection.

According to this invention there is provided for an aircraft ejection seat, an ejection gun comprising at least two telescopically interfitted cylinders defining a closed chamber, explosive means for so supplying expansive gas to the chamber as to effect gun extension with a gun thrust/time characteristic suitable for an air-environment ejection, means for admitting pressure fluid, from a source independent of the explosive means, to the chamber to effect gun extension with a thrust/time characteristic suitable for underwater ejection, and means effective to reduce the volume of pressure fluid required to develop the gun thrust appropriate for underwater ejection. Such means conveniently include a transverse partition fitted to one cylinder of the gun to transmit gun-extending thrust to such cylinder upon admission of pressure fluid from the source to that part of the chamber bounded by the partition and the outer gun cylinder for underwater ejection, the partition being adapted to be displaced or ruptured by the expansive gas supplied to the chamber by the explosive means so that such gas may produce gun-extending thrust by expansion within the gun chamber as a whole.

In such an ejection gun, the explosive means may be designed appropriately with respect to the volume of the chamber and the changes in such volume during gun extension, to provide a desired gun thrust/time characteristic for an air-environment ejection, whilst a source of pressure fluid may be provided to effect gun extension with the required thrust/time characteristic for underwater ejection, with considerably smaller pressure and volume requirements of the source than would be the case were the whole chamber defined by the gun cylinders to be exposed to fluid from such source for underwater ejection.

According to a further aspect of the invention, an ejection gun for an aircraft ejection seat comprises an outer gun cylinder, an intermediate piston-forming cylinder telescopically slidable in the outer gun cylinder and an inner piston-forming cylinder telescopically slidable in the intermediate piston, the cylinders together defining a telescopically-extensible closed chamber, a partition closing the inner end of the inner piston and separable from the latter by thrust applied to the partition from within the inner piston but capable of transmitting gun-extending thrust to the inner piston upon admission of pressure fluid to the outer gun cylinder, and an exxplosive cartridge for generating and supplying gas to the inner piston to cause separation of the partition from the inner piston and telescopic extension of the gun.

Preferably, the partition may comprise a disc spanning, and having a releasable connection to, the inner end of an inner cylinder, e.g. the inner piston in the case of a three-cylinder construction.

Conveniently, the disc has an annular flange portion rivetted in the end of the inner cylinder or piston. Such manner of securing the disc to the inner cylinder or piston provides a satisfactory connection which, however, when the gun is to be extended by means of explosive-generated gas pressure, permits ready detachment of the disc by shearing of the rivets in its flange portion.

Conveniently, the pressure fluid employed to effect gun extension for underwater ejection is air, stored in a pressure vessel at, for instance, a pressure of 3000-lbs./square inch.

Figure 1B:
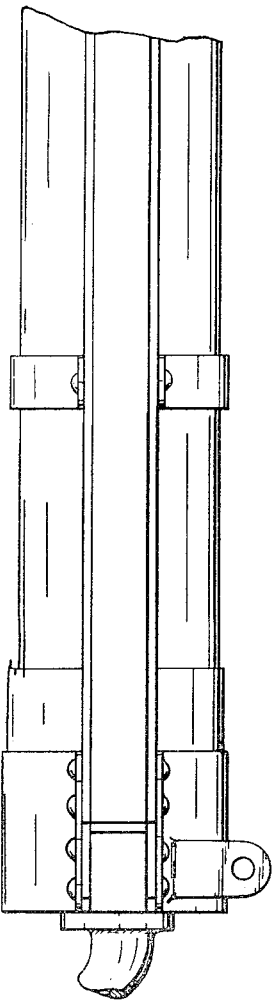
Figure 2A:
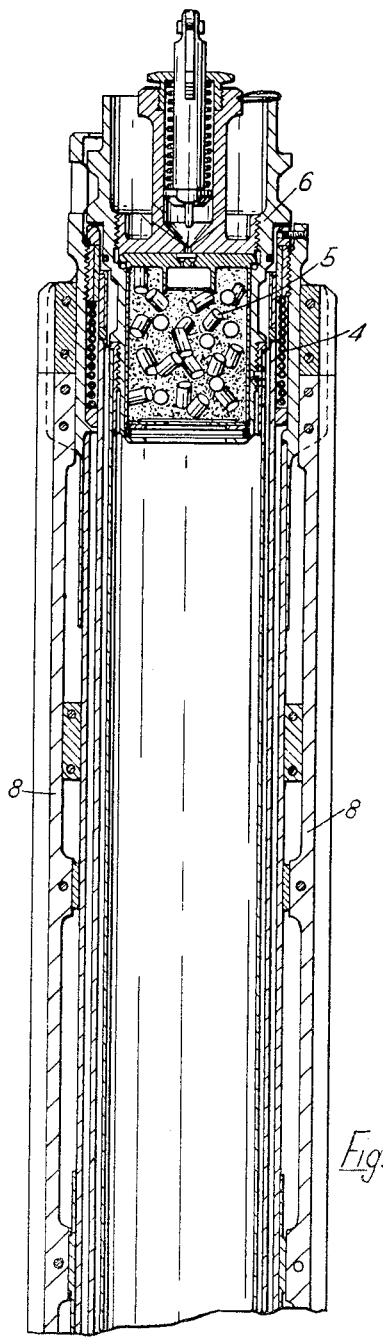
Figure 2B:
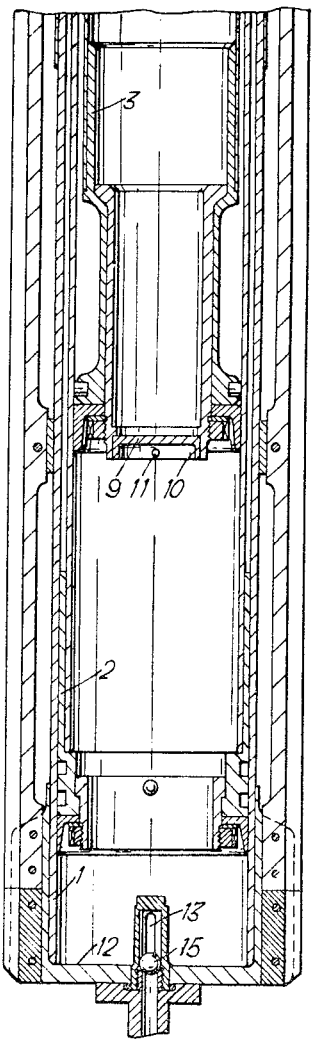

In order that the invention may be more readily understood, one embodiment of the same will now be described by way of example and with reference to the accompanying drawings in which:

FIGURES 1A and 1B are together a partial elevational view of an ejection gun in accordance with the invention; and FIGURES 2A and 2B are a longitudinal sectional view of the gun of FIGURE 1.

The illustrated ejection gun is adapted to be used in conjunction with an aircraft ejection seat of the well-known construction manufactured by the Martin-Baker Aircraft Co., Ltd. and comprises an outer gun cylinder 1 which is adapted to be connected to the aircraft, this gun cylinder having telescopically slidable therein an intermediate piston 2 in the form of a cylinder and an inner piston 3, also in the form of a cylinder, telescopically slidable in the intermediate piston. The inner piston is adapted to engage the seat structure (not shown) so that telscopic extension of the gun cylinders applies thrust to the seat to eject it from the aircraft. During extension of the gun, the intermediate piston 2 moves outwardly from the gun cylinder to a point where abutment means comprising a set of gas-filled cushioning rings 4 on the gun cylinder 1 engage the intermediate piston 2. The inner piston 3 is free to leave the intermediate piston 2 when the gun has fully extended.

Normal extension of the gun, for ejection in an air-environment, is effected by firing an explosive cartridge 5 housed in a firing body 6 communicating with the interior of the inner piston 3 at the outer end of the latter, gases generated by such cartridge raising the pressure within the closed chamber constituted by the gun cylinders. In the illustrated embodiment, there are two auxiliary cartridges in housing 7 on the side of the cylinder 1 and fired during gun extension to supply further gas to the chamber to maintain or increase the pressure therein: one of the housings 7 is not shown in the drawings for simplification thereof.

The gun as thus far described will be recognized as being of the construction disclosed in Patent No. 2,736,236 and, like the latter, includes guide rails 8 on the outside of the cylinder 1 for guiding slippers on the ejection seat during extension of the gun, and a lock (not shown) that secures the aircraft seat to the outer gun cylinder 1 until gun extension commences.

In accordance with the present invention, however, the chamber defined by the gun cylinders is divided into two parts by a partition which comprises a disc 9 releasably connected to the inner end of the inner piston 3. The disc 9 spans the end of the inner piston 3 and has an annular flange portion 10 that enters the latter, such portion 10 being rivetted, as at 11, to the piston 3.

Thus, on one side of the partition disc 9 is the inner piston 3 and on the other side the base 12 of the gun cylinder 1, this base 12 being provided with an inlet port 13 through which compressed air may be introduced, the compressed air travelling to the port from a storage vessel (not shown) via a pipe 14 and a non-return ball valve 15 which isolates the pipe and storage vessel from pressure created within the gun when the gun is to be extended by cartridge gases.

When it is desired to eject the airman/seat combination from the aircraft by means of the compressed air contained in the storage vessel, a valve is opened in the pipe from the latter to the non-return valve 15, compressed air then flowing through the non-return valve and into the outer gun cylinder in front of the disc 9. This compressed air, acting on the disc 9, drives the intermediate piston 2 and the inner piston 3 together along the outer gun cylinder 1 until the point is reached at which the gun cylinder arrests the intermediate piston 2. The inner piston 3, and with it the seat, continues its movement under the thrust acting on the disc 9 until the gun is fully extended and the inner piston 3 separates from the remainder of the gun.

I claim:

1. An ejection gun for an aircraft ejection seat comprising an outer gun cylinder, an intermediate piston-forming cylinder telescopically slidable in said outer gun cylinder and an inner piston-forming cylinder telescopically slidable in said intermediate piston, said cylinders together defining a telescopically-extensible closed chamber, a partition closing the inner end of said inner piston-forming cylinder and dividing the closed chamber into two parts, means for admitting a pressure fluid to one of said chamber parts bounded by the outer gun cylinder and said partition, the admitted pressure fluid applying a thrust to the partition, and an explosive cartridge for generating and supplying expansive gas to the other chamber part bounded by the inner piston-forming cylinder and said partition, the expansive gas causing telescopic extension of the gun, said partition being separable from the inner piston-forming cylinder by the thrust of the expansive gas but capable of transmitting gun-extending thrust to said inner piston-forming cylinder by the thrust of the pressure fluid.

2. An ejection gun according to claim 1, wherein said partition comprises a disc spanning and having a releasable connection to the inner end of said inner piston.

3. An ejection gun according to claim 2, wherein said disc has an annular flange portion rivetted in the end of the inner piston.

References Cited by the Examiner

UNITED STATES PATENTS

| 2,479,713 | 8/49 | Beach | 244—121 |
| 2,579,683 | 12/51 | Lobelle | 244—122 |
| 2,693,326 | 11/54 | Lobelle | 244—122 |
| 2,736,236 | 2/56 | Martin | 89—1 |
| 2,924,404 | 2/60 | McAnally | 244—121 |

BENJAMIN A. BORCHELT, *Primary Examiner.*